United States Patent [19]

Kinoshita et al.

[11] Patent Number: 4,872,948

[45] Date of Patent: Oct. 10, 1989

[54] METHOD AND APPARATUS FOR CONTROLLING CENTRIFUGAL THIN FILM DRYER

[75] Inventors: Mitsuo Kinoshita; Tetsuo Ito, both of Hitachi; Hiroji Mikawa, Ibaraki; Koichi Chino, Hitachi, all of Japan

[73] Assignee: Hitachi, Ltd., Tokyo, Japan

[21] Appl. No.: 471,861

[22] Filed: Mar. 3, 1983

[30] Foreign Application Priority Data

Mar. 5, 1982 [JP] Japan ................................. 57-33927

[51] Int. Cl.[4] ............................................. B01D 1/22
[52] U.S. Cl. .................................... 159/6.2; 159/44; 159/49
[58] Field of Search ........................ 159/6.2, 44, 49; 364/500; 202/206, 160, 2

[56] References Cited

U.S. PATENT DOCUMENTS

| | | | |
|---|---|---|---|
| 2,857,962 | 10/1958 | Rogers | 159/6.2 |
| 3,242,971 | 3/1966 | Carter et al. | 159/6.2 |
| 3,542,112 | 11/1970 | Monty | 159/49 |
| 3,977,936 | 8/1976 | Murakami et al. | 159/49 |

FOREIGN PATENT DOCUMENTS 55-3359 1/1980 Japan.

OTHER PUBLICATIONS

Perry's, *Chemical Engineers' Handbook*, 4th ed., (1963), pp. 15–33 to 15–44.

Primary Examiner—Peter Chin
Attorney, Agent, or Firm—Fay, Sharpe, Beall, Fagan, Minnich & McKee

[57] ABSTRACT

Disclosed is a control system for a centrifugal thin film dryer wherein a slurry including solid matter is fed to a tubular heating surface and the a slurry is heated while blades are rotating inside the heating tube so that the a slurry turns into dry powder, the system comprising a plurality of thermal sensors located on the heating surface, a dry-up point calculator which measures the temperature distribution along the heating surface in accordance with the signals provided by the thermal sensors and calculates the point at which the temperature rise begins to saturate, a flow rate setting device which calculates the quantity of a slurry to be supplied in accordance with the output of the dry-up point calculator, and a flow rate regulator which controls a pump in accordance with the signal provided by the flow rate setting device.

5 Claims, 3 Drawing Sheets

METHOD AND APPARATUS FOR CONTROLLING CENTRIFUGAL THIN FILM DRYER

BACKGROUND OF THE INVENTION

1. Field of the Invention

The present invention relates to a method and apparatus for controlling a centrifugal thin film dryer.

2. Description of the Prior Art

The centrifugal thin film dryer dehydrates slurry (i.e., drainage or refuse such as sullage emanating from industrial waste streams and sewage, having a composition of liquid and solid mater which may vary as a function of time) for separating solid matter and moisture, and because bringing an effective method of dehydration and allowing easy handling of solid matter which is obtained in powder form, it is widely used in processing systems for waste fluid and the like.

The centrifugal thin film dryer has been controlled by the method described in Japanese Patent Publication No. 33559/80. In this method, a plurality of thermal sensors are provided in the drying region and evaporating region within the centrifugal thin film dryer and the flow rate of slurry to be fed to the dryer is controlled in accordance with the temperature signals provided by the sensors such that each section of the dryer has a specified temperature.

In this method, however, the degree of dryness of sullage within the dryer cannot be known accurately as will be mentioned later, and accordingly, controlling of the dryer for an increased process efficiency is limited and a possibility of outputting powder with high moisture content is likely in some conditions.

SUMMARY OF THE INVENTION

One object of the present invention is to provide a method and apparatus for controlling a centrifugal thin film dryer, wherein the degree of dryness of slurry within the dryer is estimated so as to perform a precise control of the dryer depending on the degree of dryness of the inside, thereby maintaining a high process efficiency.

Another object of the present invention is to provide a method and apparatus for controlling a centrifugal thin film dryer, wherein slurry is dried to powder with low moisture content and yet wear of the dryer can be reduced.

According to one aspect of the present invention, the position at which slurry including solid matter dries up up is calculated on the basis of the temperature distribution on the heating surface obtained from temperatures at many locations within the centrifugal thin film dryer and the temperature of steam applied to the heating surface, and the flow rate of slurry fed into the dryer is controlled in accordance with these calculated data, whereby a precise operation with ample margins in flow rate for the critical flow rate in the drying process can be achieved. Besides the control of the flow rate of slurry in achieving the above-mentioned object of the invention, the boiling point of a slurry on the heating surface is adjusted by controlling the pressure in the dryer or the temperature of steam applied to the heating surface is adjusted thereby to control the thermal flux from the heating surface of slurry, and these alternative methods achieve the same effect as those of the slurry flow rate controlling mentioned previously.

According to another aspect of the present invention the rotational speed of the blades is controlled in accordance with the moisture content of powder outputted from the dryer, the temperature of powder, or the calculated powdering characteristics of the dryer, thereby to achieve the operation with a margin in the rotational speed for the powdering process. The temperature of solid matter (powder) is substantially in inverse proportion to the percentage of moisture content.

The present invention is based on the experimentally proved fact that the production of powder containing much moisture results in a lower temperature of powder at the delivery port of the dryer, that if such production is due to an excessive processing flow rate, the dry-up point of slurry calculated from the temperature of the heating surface and the temperature of steam applied to the heating surface is at the lower end portion of the heating surface, and that if such production is due to too small a rotational speed of the blades the dry-up point is at normal position. And, in order to prevent the production of powder containing much moisture, in one embodiment of the present invention the processing flow rate is controlled so that the dry-up point comes to the target position, and the rotational speed of the blades is controlled so that the temperature of powder stays higher than a specified level.

It is believed that the production of powder containing much moisture caused by too small a rotational speed even with the normal dry-up position is due to the fact that slurry to have an abnormally high viscosity during its concentration process and adheres to the heating surface and blades, and a deposit of thus adhered, accumulated sullage containing much moisture does not flow down on the heating surface, but falls directly. Considering these facts, abnormality in powdering process can be prevented by controlling the rotational speed of the blades in accordance with the calculated powdering characteristics such as the viscosity of slurry within the dryer.

DESCRIPTION OF THE PREFERRED EMBODIMENTS

The invention will now be described in detail with reference to the drawings.

Figure 1:
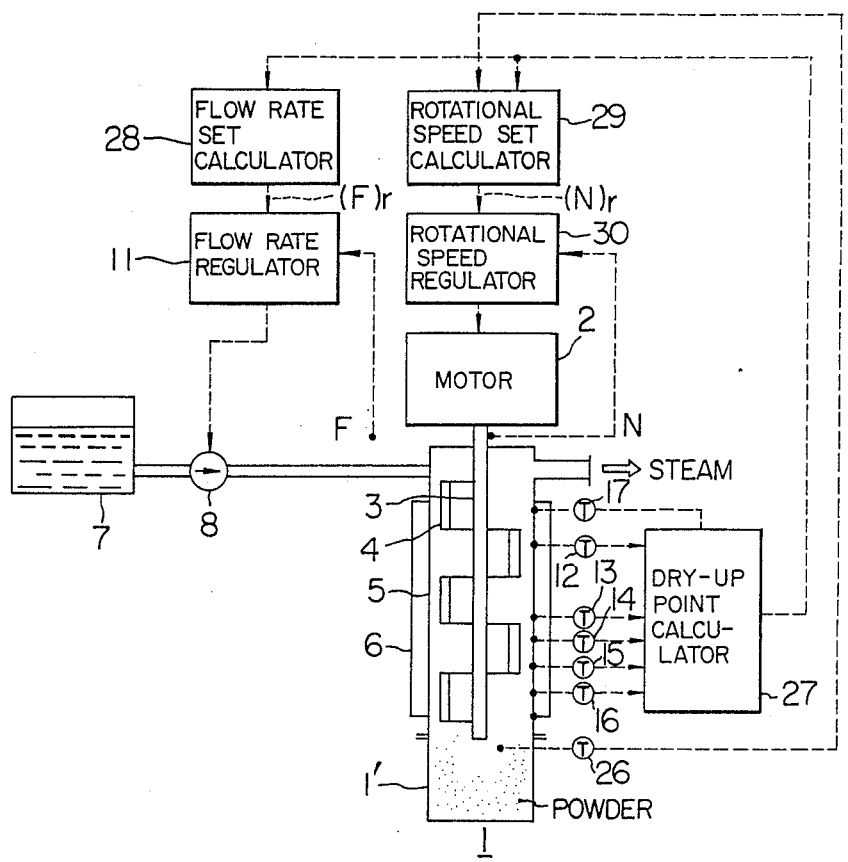
FIG. 1 is a block diagram showing one embodiment of the present invention.

In FIG. 1, a centrifugal thin film dryer 1 has a dryer vessel 1' including heating surface 5 surrounded by a steam jacket 6 containing therein pressurized steam, and a rotor 3 with a plurality of movable blades 4 provided thereon. Slurry containing solid matter, such as waste fluid, in a tank 7 is fed to the centrifugal thin film dryer vessel 1' by a pump 8, while the rotor 3 is driven by a motor 2, and the slurry is pressed by the centrifugal force to form a thin film on the tubular heating surface 5 of the dryer vessel 1'. The pressure in the dryer vessel 1' is reduced to lower than atmospheric pressure to prevent the content of the dryer vessel 1' from going outside and to reduce boiling temperatures of fluids therein. The thin slurry film is heated by the pressurized steam supplied into the heating jacket 6 and concentrated by evaporation while it flows down on the heating surface 5, and the slurry turns into dry powder.

Figure 2:
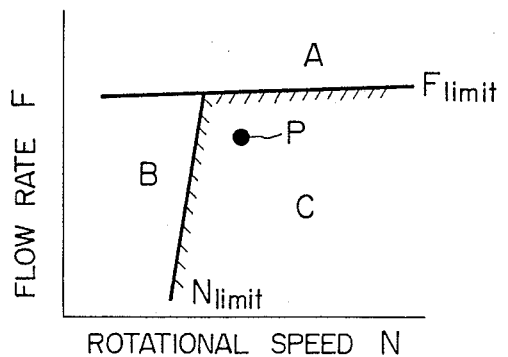
FIG. 2 is a graphical representation showing the range of operation for processing waste fluid into powder containing less moisture.

According to the examination by the inventor, it was made clear that the centrifugal thin film dryer has an operating range as shown in FIG. 2. In the figure, region A represents an operational region in which too much slurry is fed into the dryer and it is not dried completely when it reaches the lower end of the heating surface 5, resulting in a production of powder containing much moisture, while region B represents an operational region in which the rotor speed is too low to carry out the normal concentration or powdering of the slurry, resulting in a failure to dry slurry into powder with low moisture content. At this time, the heating surface has a temperature at its bottom end substantially equal to the temperature of the heating system, and it looks like a normal powdering process is proceeding. Therefore, in order to dry waste substance into powder with low moisture content, the operational conditions must be maintained within region C where the flow rate is lower than the critical flow rate $F_{limit}$ and the rotor speed is higher than the critical rotational speed $N_{limit}$. For a much improved process efficiency, the flow rate F should be set as large as possible, and for the reduction of wear of the heating surface 5 and movable blades 4, the rotational speed N should be set as small as possible. Accordingly, in most cases the operating point is preferably set, for example, as shown by P in FIG. 2. However, the critical values $F_{limit}$ and $N_{limit}$ vary depending on the composition of waste substance and the condition of the dryer. Accordingly, the present invention characteristically resides in the method and apparatus for controlling a centrifugal thin film dryer, wherein the normal operational condition can be set to the optimal values against such variations.

Figure 3:
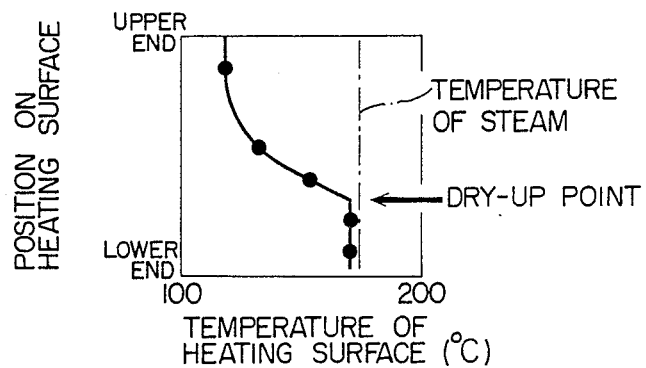
FIG. 3 is a graphical representation explaining the relationship between the temperature distribution on the heating surface and the dry-up position.

In FIG. 1, thermocouple-thermometers 12-16 located in several positions on the heating surface of centrifugal thin film dryer vessel 1' and a steam thermometer 17 provide signals to a dry-up point calculator 27. By interpolating a plurality of surface temperatures, the temperature distribution on the heating surface as shown, for example, in FIG. 3 is obtained. In the process of concentrating the waste fluid, the heating surface is cooled to a low temperature by evaporation, however at the point where material is dried up, the temperature of the heating surface does not fall much but substantially equals the temperature of steam for heating. That is, the position where the temperature rise of the heating surface beings to saturate at the vicinity of the steam temperature is the dry-up point for the wasted fluid. The dry-up point calculator 27 gives the dry-up point based on the temperatures of the heating surface and steam. The resultant positional data is fed to a flow rate setting calculator 28 which operates on a flow rate regulator 11 and the pump 8 to control the dry-up point for the waste fluid to the target position. In consequence, the flow rate F can be maintained at the optimal value below the critical value $F_{limit}$. In order to achieve the maximum process efficiency, the dry-up point is brought to a position of about 90% when measured from the upper or upstream end of the heating surface as 0% and the lower or downstream end of the heating surface as 100%.

Figure 4:
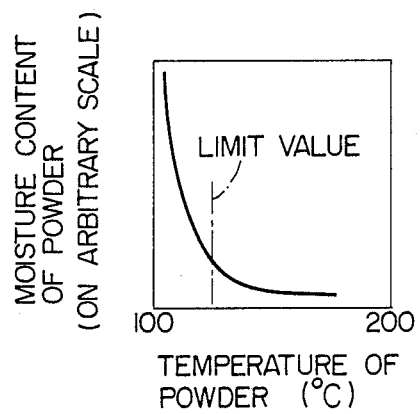
FIG. 4 is a graphical representation explaining the relationship between the temperature and the moisture content of powder.

The thermocouple-thermometer 26 located at the delivery port of the centrifugal thin film dryer 1 measures the temperature of output powder. The temperature of powder is in inverse proportion to the moisture content of powder as shown in FIG. 4. Accordingly, the moisture content of powder can be maintained below a certain reference value by controlling the temperature of powder above a limited value. As mentioned above, the flow rate F can be maintained below the critical level $F_{limit}$ by controlling the dry-up point to the target position. Therefore, if this controlling is being effected and still the temperature of powder falls below the limited value, it means that the rotational speed falls below the critical value $N_{limit}$. Accordingly, by providing the dry-up point of the waste fluid and the temperature of powder to a speed setting calculator 29, and operating on a speed regulator 30 to control the rotational speed of the motor 2, the rotational speed N can be maintained above the critical value $N_{limit}$. The foregoing method allows the operational conditions of the flow rate and rotational speed to be maintained properly so that powder with low moisture content can be produced.

Figure 5:
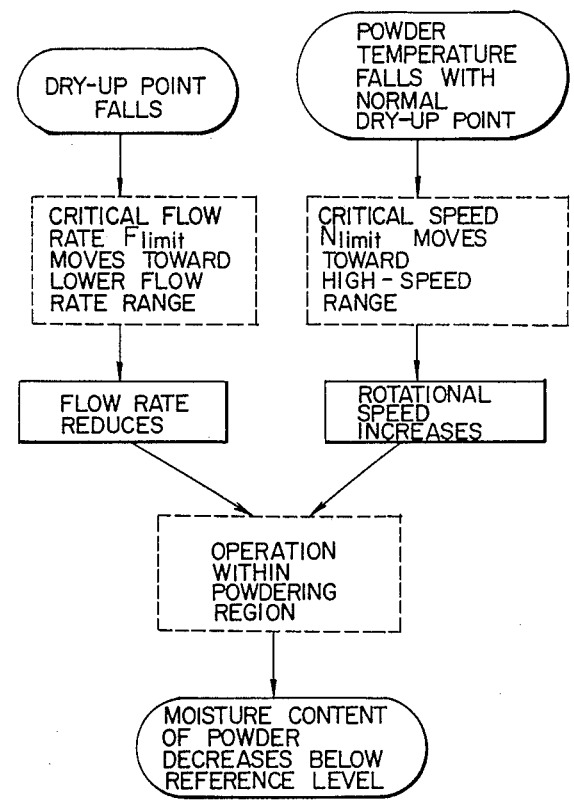
FIG. 5 is a flowchart explaining the operation of the embodiment.

FIG. 5 explains briefly the operation of the present invention for the cases in which the dry-up point has moved to a lower position and the temperature of powder has fallen when the dry-up point is at normal position. If both of the dry-up point and powder temperature are abnormal, the dry-up point is corrected first.

Effects similar to those of the foregoing embodiment can be achieved by adjusting the boiling point of slurry by controlling the interior pressure of the dryer, or by adjusting the temperature of steam for heating, instead of adjusting the flow rate of slurry fed into the dryer. The present invention is effective in using the moisture content of powder instead of the temperature of powder. Moreover, the present invention is effective in using the result of calculation for powdering characteristics inside the dryer (e.g., the viscosity of slurry in the concentration process), instead of using the temperature and moisture content of powder.

Figure 6:
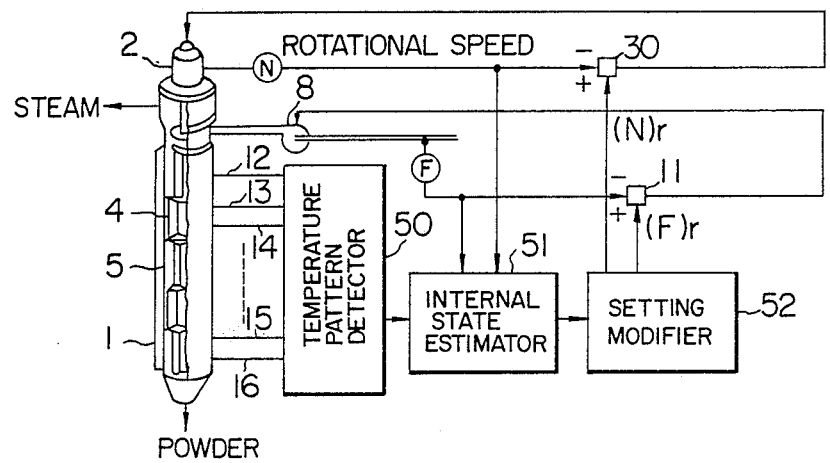
FIG. 6 is a block diagram showing another embodiment of the present invention.

FIG. 6 shows another embodiment of the present invention, where common reference numerals are used for the portions which are shown in FIG. 1 and explanation thereof will be omitted.

A temperature pattern detector 50 serves identically to the dry-up point calculator in FIG. 1, and it measures the temperature distribution along the heating surface as shown in FIG. 3. Particularly, the point at which the temperature rise begins to saturate corresponds to the dry-up point, and it serves as a criterion for determining whether the drying process goes on normally.

An interior state estimator 51 incorporates a model of drying/powdering process based on the mass balance equations, with respect to solid matter and moisture in slurry, and estimates process parameters such as the concentration of material within the dryer and the flow rate of liquid film by receiving the flow rate of slurry and the rotational speed N of the motor 2 in addition to the above-mentioned temperature distribution.

A setting modifier 52 updates the flow rate and rotational speed based on the result of estimation by the estimator 51 and alters the setting of these values so that they meet the states of process. This system provides more perfect estimation about the interior states of the dryer as compared with the system shown in FIG. 1, providing an adaptive control against a possible variation in the internal process and allowing a stable operation for along time. Moreover, it is also possible to obtain the criterion for determining whether the powdering process with the desired moisture content proceeds, without installation of a moisture meter at the delivery port of the dryer.

In the embodiment shown in FIG. 6, use may be made of a 16-bit microprocessor such as HIDIC-08L manufactured by Hitachi, Ltd. so that the microprocessor serves as the members 50-52, 11 and 30.

According to the present invention, slurry containing solid matter can be effectively dried to powder with low moisture content. At the same time, the wear of blades and the heating surface of a dryer can be minimized, while achieving the maximum process efficiency for slurry, whereby the service life of the dryer can effectively be prolonged.

We claim:

1. A method of controlling a centrifugal thin film dryer wherein said dryer has a dryer vessel including a tubular heating surface and having a delivery port, comprising the steps of reducing the pressure in said dryer vessel to lower than atmospheric pressure, feeding slurry containing solid matter at a variable flow rate to said tubular heating surface, heating said slurry with a heating medium while rotating blades inside of said heating surface so that said slurry travels along said heating surface as a thin film and turns into dry powder, measuring temperatures at a plurality of locations spaced apart along the axial direction of said heating surface upstream from the delivery port of the dryer and controlling the position along said axial direction of said heating surface where a rise in the distribution of said temperatures measured begins to saturate at the vicinity of the heating medium temperature by adjusting at least one of said flow rate, the pressure within said dryer vessel, and the degree of heating by said heating surface on the basis of the temperatures measured to maintain said position upstream from the delivery port of the dryer; and measuring the moisture content of the dry powder, and controlling the moisture content of the dry powder by adjusting the rotational speed of the rotating blades in dependence upon the moisture content measured and the position along said axial direction of said heating surface where a rise in the distribution of said temperatures measured approaches the saturation temperature of the heating medium.

2. A method of controlling a centrifugal thin film dryer wherein said dryer has a vessel including a tubular heating surface having a delivery port, comprising the steps of reducing the pressure in said dryer vessel to lower than atmospheric pressure, feeding slurry containing solid matter at a variable flow rate to said tubular heating surface, heating said slurry while rotating blades inside of said heating surface so that said slurry travels along said heating surface as a thin-film and turns into dry powder, measuring the temperatures at a plurality of locations spaced apart along said heating surface upstream from the delivery port of the dryer and measuring the temperature of a heating medium for heating said heating surface, controlling the position along said heating surface where a rise in the distribution of said temperatures measured begins to saturate at the vicinity of said heating medium temperature by adjusting at least one of said flow rate, the pressure within said dryer vessel, and the temperature of said heating medium on the basis of the temperatures measured along said heating surface and the temperature of said heating medium to maintain said position upstream from the delivery port of the dryer; and measuring the moisture content of the dry powder, and controlling the moisture content of the dry powder by adjusting the rotational speed of the rotating blades in dependence upon the moisture content measured and the position along said heating surface where a rise in the distribution of said temperatures measured approaches the saturation temperature of the heating medium.

3. A method of controlling a centrifugal thin film dryer, comprising the steps of:

feeding slurry containing solid matter at a predetermined variable flow rate to a tubular heating surface of a dryer having a delivery port;

heating said slurry while rotating blades inside of said heating surface so that said slurry turns into dry powder;

detecting the position of the dry-up point of said slurry along the path traveled by the slurry over the heating surface by measuring temperatures at a plurality of locations along said heating surface, said plurality of locations being disposed at places other than the delivery port of the dryer;

detecting a process parameter representative of a characteristic of said dry powder resulting from said slurry; and controlling the moisture content of said dry powder by adjusting the rotational speed of said blades in dependence upon the position of said dry-up point detected and the value of the process parameter detected to maintain said position upstream from the delivery port of the dryer, wherein said step of detecting a process parameter comprises sensing the moisture content of the dry powder.

4. A method of controlling a centrifugal thin film dryer wherein said dryer has a dryer vessel including a tubular heating surface and having a delivery port, comprising the steps of:

reducing the pressure in said tubular heating surface to lower than atmospheric pressure;

feeding slurry containing solid matter at a variable flow rate to said tubular heating surface and heating said slurry while rotating blades inside of said heating surface so that said slurry turns into dry powder;

detecting the position of the dry-up point of said slurry along the path traveled over said heating surface by said slurry by measuring temperatures at a plurality of locations along said heating surface, said plurality of locations being disposed at places other than the delivery port of the dryer;

detecting a process parameter representative of a characteristic of the dry power produced from said slurry; and controlling the value of said process parameter and the position of said dry-up point along said heating surface by adjusting at least one of said flow rate, the pressure within said dryer vessel, the degree of heating for said heating surface, and the rotational speed of said blades on the basis of the position of said dry-up point detected and the value of the process parameter detected to maintain said position upstream from the delivery port of the dryer, wherein said step of detecting a process parameter comprises sensing the moisture content of the dry powder.

5. A control system for a centrifugal thin film dryer of the type wherein a slurry containing solid matter is fed at a variable flow rate to a tubular heating surface and said slurry is heated with a heating medium while blades are rotating inside said heating surface, said drying having a discharge port, comprising:

a plurality of thermal sensors located on said heating surface at a plurality of locations upstream from the discharge port of the dryer;

dry-up point calculator means for determining in real time the distribution of temperature along said heating surface on the basis of signals from said thermal sensors, for determining the position at which a rise of said temperatures approaches the saturation temperature of the heating medium, and for providing a first signal indicative of the position of the dry-up point;

flow rate setting means for calculating and providing a second signal indicative of the quantity of slurry to be supplied in response to said first signal from said dry-up point calculator means;

a flow rate regulator which controls said variable flow rate in accordance with said second signal from said flow rate setting means;

sensor means for detecting and providing an output signal representative of a process characteristic of said dry powder;

rotational speed setting means for calculating and providing a regulating signal establishing a rotational speed of the blades in accordance with said output of said dry-up point calculator means and said output signal;

means responsive to said speed setting means for regulating the speed of said blades in accordance with said regulating signal from said speed setting means, wherein said sensor means comprises means for detecting the moisture content of dry powder emanating from said heating surface.

* * * * *